United States Patent [19]

Ohta et al.

[11] Patent Number: 4,576,437
[45] Date of Patent: Mar. 18, 1986

[54] CONNECTOR FOR FIBRE OPTIC CABLE

[75] Inventors: Yukitake Ohta; Yasuo Fukunaga, both of Mooka, Japan

[73] Assignee: Allied Corporation, Morris Township, Morris County, N.J.

[21] Appl. No.: 353,281

[22] Filed: Mar. 1, 1982

[30] Foreign Application Priority Data

Mar. 6, 1981 [JP] Japan .............................. 56-30290[U]

[51] Int. Cl.$^4$ .......................... G02B 6/36; G02B 6/44
[52] U.S. Cl. ............................... 350/96.20; 350/96.23
[58] Field of Search ............................ 350/96.20, 96.23

[56] References Cited

U.S. PATENT DOCUMENTS

| | | | |
|---|---|---|---|
| 4,047,797 | 9/1977 | Arnold et al. | 350/96.21 |
| 4,133,601 | 1/1979 | LeGuen et al. | 350/96.21 |
| 4,139,260 | 2/1979 | Bouygyes et al. | 350/96.22 |
| 4,168,109 | 9/1979 | Dumire | 350/96.20 X |
| 4,398,703 | 8/1983 | Ohta et al. | 350/96.23 X |
| 4,440,469 | 4/1984 | Schumacher | 350/96.20 |

FOREIGN PATENT DOCUMENTS 2054191  1/1981  United Kingdom ............ 350/96.20

Primary Examiner—William L. Sikes
Assistant Examiner—Akm E. Ullah
Attorney, Agent, or Firm—Roger H. Criss

[57] ABSTRACT

A connector for fibre optic cable. The connector includes an elongate body having first and second ends and an annular opening at the first end for receiving the fibre optic cable. The connector also has an insertion section for inserting into an end of the fibre optic cable, the insertion section having a smaller diameter and a smaller cross-sectional area than the elongate body and an annular opening for receiving a portion of the fibre optic cable.

10 Claims, 11 Drawing Figures

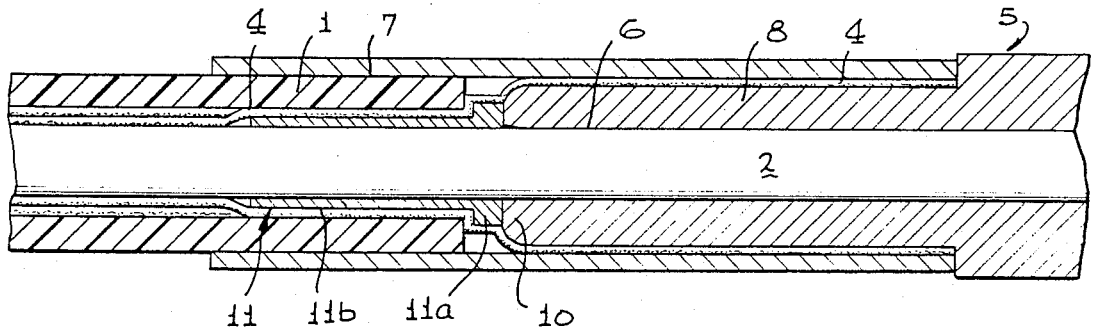
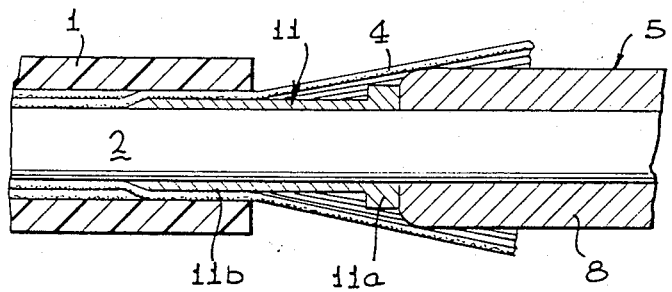
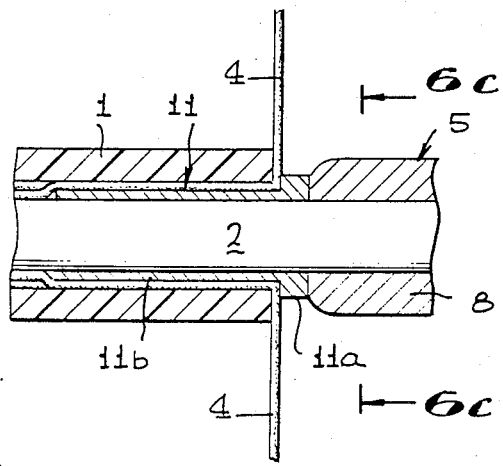
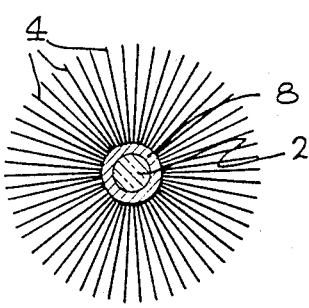
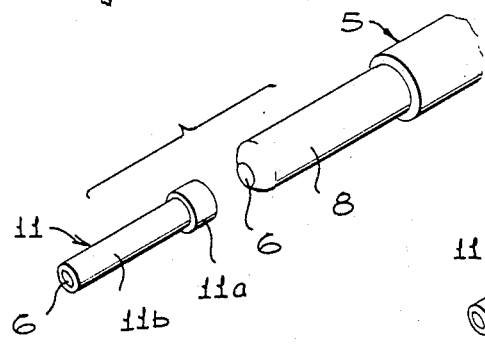
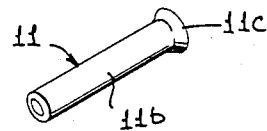

CONNECTOR FOR FIBRE OPTIC CABLE

TECHNICAL FIELD

The present invention relates to a fibre optic cable connector and, more particularly, to a fibre optic cable connector having improved capability for secure attachment to a fibre optic cable.

BACKGROUND OF THE PRIOR ART

Fibre optic cables are being used in greater and greater frequency in the telecommunication industry for conveying large amounts of data. During the course of using fibre optic cables, it is necessary to terminate and join the cables at various locations and connectors are used to facilitate such termination and connection. It is very important for the effective transmission of data that the fibre optic information carrier in the fibre optic cable be properly positioned when cables are joined or terminated. If a mismatch occurs between the fibre optics of two fibre optic cables, the transmission efficiency of the cable is severely degraded. It is important, therefore, that the fibre optic cable be securely attached to its connector so that the imposition of a pulling force on the cable will not cause the fibre optic therein to be improperly positioned. While fibre optic cable connectors are known in the prior art, they have not provided a very secure and relatively simple method of attachment to a fibre optic cable.

Turning briefly to FIGS. 1-3, there is shown in FIG. 1 a conventional fibre optic cable with the various portions thereof stripped a way to expose the underlying portions. The fibre optic 3 within the cable is encased in a fibre core 2 which in turn is protected by a multitude of long thin fibres 4 evenly placed around the circumferencial surface of the fibre core 2 and parallel to the center axis of optic fibre 3. The thin fibres 4 are held in place by an outer cover 1. The long thin fibres 4 may be made from the product known as Kevlar and typically inhibit the fibre optic cable from being stretched.

FIG. 2 depicts, in section, a typical prior art fibre optic connector coupled to a fibre optic cable. This connector is assembled on the cable by first removing portions of the various layers of the cable as generally shown in FIG. 1. The fibre optic 3 and its fibre core 2 are inserted in a hole 6 in the connector's main body, a ferrule 7 having first slipped over the exposed end of the cable. The exposed reinforcement fibres 4 are secured to the connector body 5 by the action of ferrule 7 being crimped against crimping section 8 thereby capturing fibres 4 therebetween. In prior art connectors, in lieu of crimping ferrule 7, it is also known to use an adhesive such as epoxy to capture reinforcement fibres 4 between the inner circumferencial surface of ferrule 7 and the outer circumferential surface of crimping section 8. In FIG. 2, numeral 9 refers to a coupling nut conventionally employed with connectors.

It might appear that a connector manufactured and assembled as described with reference to FIG. 2 would provide a connector-cable joined of theoretically high strength. However, in reality, high strength is not obtained due to the difficulty in making up the connection between the connector and the cable. Namely, when using the prior art connector, the reinforcing fibres 4 tend to collect on one side or the other of the circumferential surface of crimping section 8 as is depicted in FIGS. 3a and 3b. When a connector is joined to a cable with the reinforcing fibres bunched on one side of the connector and the cable-connector joint is placed in tension, the pulling force applied to the cable is unbalanced between the side having more reinforcing fibres 4 and the side having fewer reinforcing fibres 4. The net result is a decrease in the strength of the connector-cable joint.

It is difficult to assemble the prior art connector to a fibre optic cable without the reinforcing fibres 4 becoming disarranged as shown in FIGS. 3a and 3b. This is due to the fact that it is the outer cover 1 which holds fibres 4 in place and when the outer cover 1 is partially removed to assemble the connector to the cable, there is essentially nothing to hold the fibres 4 in place. When the connector is installed as shown in FIG. 2, this disrupts the positions of fibres 4, not only in the exposed portion, but also to a certain extent for a distance under the outer cover 1. This disturbance often results in the fibres 4 becoming disarranged as shown in FIGS. 3a and 3b. Additionally, it has been found that it is rather difficult to manually rearrange fibres 4 so that they are equally spaced around a connector (so that they resemble the spokes of an umbrella). The disarrangement of fibres 4 becomes the greatest when the end portion of the connector body 5 contacts the end portion of the outer cover 1 as the connector is installed on the cable.

BRIEF DESCRIPTION OF THE INVENTION

The connector of the present invention overcomes these shortcomings of prior art connectors by maintaining the reinforcement fibres 4 more or less evenly spaced over the circumferential surface of the connector's main body as the connector is installed thereon. This is accomplished by providing the connector with a relatively thin sleeve which is, as will be seen, inserted between the fibre core of the fibre optic cable and the overlying reinforcing fibres. The thin sleeve pinches the reinforcement fibres against the outer cover, thereby fixing their positions. The sleeve also facilitates, as will be seen, any needed rearrangement of the fibres and makes the connector more easily attachable to the cable by a human.

BRIEF DESCRIPTION OF THE DRAWINGS

The novel features believed characteristic of the invention are set forth in the appended claims. The invention itself, however, as the preferred mode of use, further objects and advantages thereof, will be best understood by references by the following detailed description of an illustrative embodiment when read in conjunction with the accompanying drawings, wherein:

FIG. 5 is a sectional view through the connector in accordance with the present invention;

FIGS. 6a, 5b and 6c illustrate various steps in connecting the connector in accordance with the present invention to a fibre optic cable; and FIGS. 7 and 8 are perspective views of alternate embodiments of the connector of the present invention.

DETAILED DESCRIPTION OF AN ILLUSTRATIVE EMBODIMENTS

Figure 1:
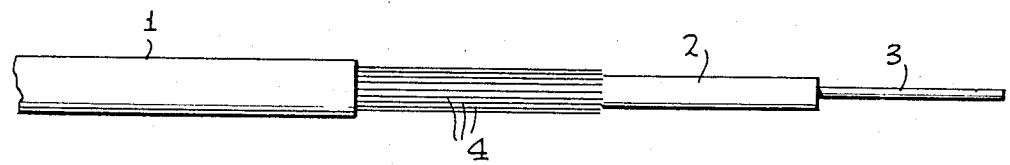
FIGS. 1, 2, 3a and 3b depict a conventional fibre optic cable, a prior art connector and the uneven fibre arrangement encountered with prior art connectors, respectively.
Figure 2:
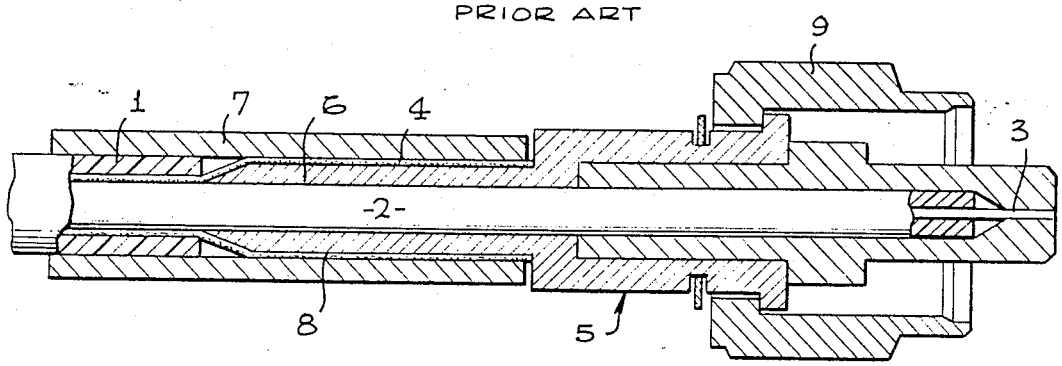
Figure 3A:
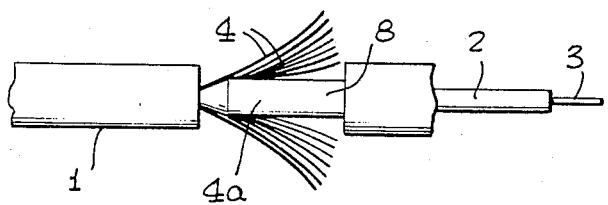
Figure 3B:
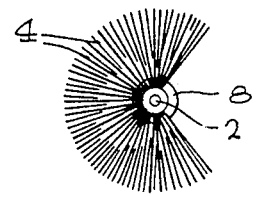
Figure 4:
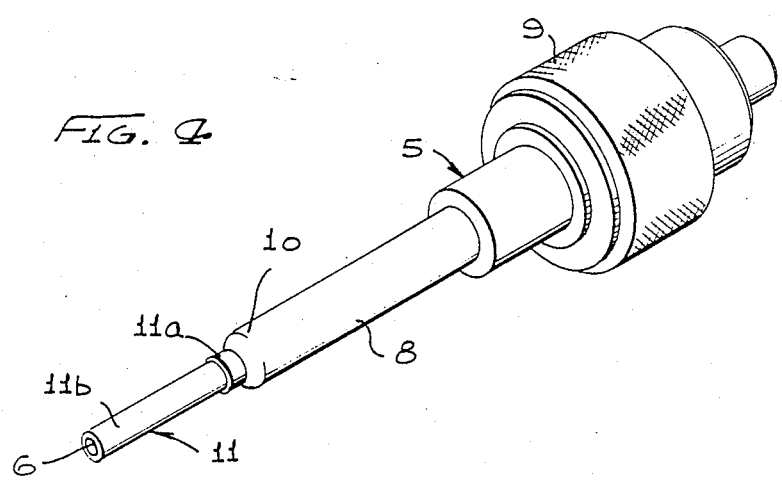
FIG. 4 is a perspective view of the connector in accordance with the present invention.

FIGS. 1, 2, 3a and 3b have previously been described in the Background of the Prior Art portion of this patent. Turning to FIGS. 4 and 5, FIG. 4 is a perspective view of a connector in accordance with the present invention and FIG. 5 is a view in section showing a portion of the connector mating with a fibre optic cable. As is the case of the prior art connector shown in FIG. 2, the connector of FIG. 4 also includes a main body 5 and a crimping section 8. The connector of FIG. 4 differs from the prior art connector, however, by the inclusion of an reinforcing sleeve 11 having a brim 11a and a relatively thin insertion section 11b disposed at the end 10 of crimping section 8 remote from coupling nut 9.

As can be seen in FIG. 5, the connector is attached to the fibre optic cable by inserting insertion sleeve 11 into the cable, the inside diameter of the insertion sleeve being sized to just accept fibre core 2 of the fibre optic cable and being sufficiently thin so as to slide easily between fibre core 2 and the reinforcement fibre layer 4. Brim 11a is of a sufficiently larger diameter so that it engages the end surface of the outer cover 1 through the reinforcement fibres 4 and thereby limits the insertion distance of insertion sleeve 11. While the thickness of the insertion section 11b is relatively thin for easy insertion, it must have some thickness for structural reasons and this thickness pinches the reinforcement fibre layer 4 between the inner circumferential surface of the outer cover 1 and the outer circumferential surface of insertion section 11b when the insertion section 11b is pressed into the fibre optic cable.

The outer diameter of the insertion section 11b is only a fraction of the diameter of the crimping section 8 of the main body 5 of the connector and there is only a small difference between the outside diameter of the insertion section 11b and the inner diameter of the reinforcement fibre layer 4 at the end of the outer cover 1. Consequently, when the connector of the present invention is compared with conventional connectors wherein the crimping section has a relatively large diameter, the amount of deflection of the reinforcement fibre layer away from fibre core 2 is less, as depicted in the partial side sectional view of FIG. 6a. Also, due to this fact, the force that tends to move reinforcement fibre layer 4 to one side or the other of the connector is small so that the connector of the present invention may be inserted without inviting disarrangement of the normal placement of the reinforcement fibres 4.

The uniform arrangement of the reinforcement fibres 4 is secured by the insertion section 11b entering between reinforcement fibre layer 4 and the fibre core 2. When the brim 11a contacts the end surface of outer cover 1 through the reinforcement fibre layer 4, as shown in FIGS. 6b and 6c, the reinforcement fibres 4 are disposed at approximately a 90° angle to the fibre core, with the individual fibres arranged with approximately even spacing in a radial pattern as is shown in FIGS. 6b and 6c. Consequently, the the ferrule 7, which has been placed over the outer cover 1 prior to installing the connector, is moved over to engage the radially directed portion of the reinforcement fibres 4, causing reinforcement fibres 4 to bend over and follow the inner surface of the ferrule 7 along the circumferential surface of crimping section 8. Due to the action of the insertion section 11b holding the reinforcement fibres 4 against outer cover 1, the approximately even radial spacing of the reinforcement fibres 4 is not disarranged by the action of engaging same with ferrule 7. Thereafter, reinforcement fibres 4 are secured in their evenly spaced condition about the outer circumferential surface of crimping section 8 by crimping the ferrule 7 in place as shown in FIG. 5.

In the event that some small amount of disarrangement of the reinforcement fibre layer 4 should be caused by insertion of the insertion section 11b into the end of the fibre optic cable, the reinforcement fibres 4 may be relatively easily manually rearranged to have approximately equal radial spacing by holding the cable with one hand and performing the rearrangement operation with the other hand. The reinforcement fibres 4 are secured in place somewhat by the action of being pinched by insertion section 11b and brim 11a against outer cover 1, and once this holding force is manually overcome to correctly arrange the reinforcement fibres 4, they tend to stay in their rearranged condition. Also, those skilled in the art will recognize from the foregoing disclosure that the use of insertion section 11b also simplifies any desired manual rearrangement of reinforcement fibres 4, because one hand may be used to hold the cable, while the other hand carries out the rearrangement operation. With the prior art connector, the person attempting to rearrange fibres 4 generally feels the need to have a third hand hold the connector in place on the end of the cable while carrying out the manual rearrangement operation with his or her two hands. No third hand is needed should some rearrangement of fibres 4 be desired when the present connector is employed.

Those skilled in the art will also recognize that after the end of a fibre optic cable has been prepared for installation to a connector, that the outer cover 1 may tend to move along the major axis of the cable due to the generally weak holding strength exerted by it against the reinforcement fibres 4 and fibre core 2. After the fibre optic cable is prepared for attachment to the connector by stripping away portions of the outer cover, etc, the relative lengths of the exposed portions can change and thereby cause problems when making up the connection. However, with the connector of the present invention, the outer cover 1 is more firmly secured relative to the fibre core 2 and reinforcement fibres 4 by the action of insertion sleeve 11, thus avoiding this additional problem with prior art connectors.

DETAILED DESCRIPTION OF ADDITIONAL EMBODIMENTS

The present invention has been described with reference to the connector having an integral insertion sleeve 11. However, the insertion sleeve may be made separately from the main body 5 of the connector as is shown in FIG. 7. In this embodiment, the insertion sleeve may be made of a synthetic resin if desired. However, the insertion sleeve 11b is generally of small size (e.g. 0.5 cm in length and 0.15 cm in outer diameter and thus it is inconvenient to handle manually and is lost relatively easily. It is also believed that the separate insertion sleeve 11 is generally more difficult to install on the fibre optic cable and therefore the embodiment of FIG. 4 is generally preferred.

Turning to FIG. 8, there is shown an alternate insertion sleeve 11, having no brim 11a, but rather having an enlarged portion 11c which is larger than the inner diameter of the outer cover 1 and thus can perform generally the same function as brim 11a.

Having described the invention in connection with certain specific embodiments thereof, further modification may now suggest itself to those skilled in the art. It is to be understood that the invention is not limited to the specific embodiments disclosed, except set forth in the appended claims.

What is claimed:

1. A connector for fiber optic cable having a fiber optic element, a fiber core surrounding said fiber element, reinforcing fibers arranged around the circumferential surface of the fiber core, and an outer cover disposed about said reinforcing fibers, said connector comprising:
   a main elongate body having first and second ends and a first annular opening at said first end, said first annular opening being sized to just receive said fiber core of said cable;
   a relatively thin insertion section for inserting into an end of said cable and extending forwardly of said main body, said insertion section having a diameter and cross-section smaller than said main body and a second annular opening sized to just receive said fiber core of said cable, the outer diameter of said insertion section being sized to be inserted between said fiber core and said reinforcing fibers; and
   a brim on said insertion section adjacent said main body for limiting the length of insertion of said insertion section into said cable, the outside diameter of said brim being greater than the outside diameter of said insertion section but less than the outside diameter of said main body, said brim being adapted to contact an end of said outer cover of said cable through said reinforcing fibers to deflect said reinforcing fibers from said fiber core and to substantially evenly space said reinforcing fibers radially about said cable.

2. The connector of claim 1 wherein said first and second annular openings are of the same diameter and are coaxially disposed.

3. The connector of claim 2 wherein said main body includes a crimping section against which said reinforcing fibers may be crimped by a ferrule, said crimping section disposed rearwardly of said insertion section and having an outside diameter larger than the inside diameter of said outer cover of said cable.

4. The connector of claim 3 wherein said insertion section is integral with said main body.

5. The connector of claim 3 wherein said insertion section is separate from said main body.

6. In combination, a fiber optic cable connected to a fiber optic connector, said cable comprising a fiber optic element, a fiber core surrounding said fiber element, reinforcing fibers arranged around the circumferential surface of said fiber core, and an outer cover disposed about said reinforcing fibers, said connector comprising:
   a main elongate body having first and second ends and a first annular opening adjacent said first end, only said fiber core of said cable being received in said first annular opening;
   a relatively thin insertion section extending forwardly of said main body and extending into a first end of said cable, said insertion section having a diameter and cross-section smaller than said main body and having a second annular opening, only said fiber core of said cable being received in said second annular opening, the outer diameter of said insertion section being sized such that said insertion section extends between said fiber core and said reinforcing fibers; and
   a brim on said insertion member adjacent said main body, the outside diameter of said brim being greater than the outside diameter of said insertion section but less than the outside diameter of said main body, said brim contacting an end of said outer cover of said cable through said reinforcing fibers, said reinforcing fibers being deflected from said fiber core and being substantially evenly spaced radially about said cable by said brim, said reinforcing fibers extending over said brim and about said main body, said main body having a crimping section disposed rearwardly of said brim and having an outside diameter larger than the inside diameter of said outer cover of said cable; and
   a ferrule extending over said cable and said connector, one end of said ferrule extending over said end of said outer cover of said cable and the other end of said ferrule extending over said crimping section, said reinforcing fibers being disposed between said ferrule and said crimping section.

7. The invention of claim 6 wherein said first and second annular openings of said connector are of the same diameter and are coaxially disposed.

8. The invention of claim 7 wherein said ferrule is crimped against said crimping section.

9. The invention of claim 8 wherein said insertion section is integral with said main body of said connector.

10. The invention of claim 8 wherein said insertion section is separate from said main body of said connector.

* * * * *